United States Patent [19]

Nishimoto et al.

[11] Patent Number: 4,644,412
[45] Date of Patent: Feb. 17, 1987

[54] VIDEO SIGNAL RECORDING AND REPRODUCING APPARATUS

[75] Inventors: Naomichi Nishimoto, Tachikawa; Akira Hirota, Chigasaki; Yoshiteru Kosaka, Zushi, all of Japan

[73] Assignee: Victor Company of Japan, Ltd., Japan

[21] Appl. No.: 752,551

[22] Filed: Jul. 8, 1985

[30] Foreign Application Priority Data

Jul. 16, 1984 [JP] Japan .................. 59-147286

[51] Int. Cl.⁴ .............................................. H04N 5/92
[52] U.S. Cl. ..................................... 358/335; 360/32
[58] Field of Search ............. 358/310, 335, 336, 339, 358/13, 21 R, 138; 360/32, 33.1, 36.2, 38.1

[56] References Cited

U.S. PATENT DOCUMENTS

| | | | |
|---|---|---|---|
| 4,291,331 | 9/1981 | Devereux | 358/13 |
| 4,590,522 | 5/1986 | Takemoto et al. | 358/339 |
| 4,604,658 | 8/1986 | Hibino et al. | 358/339 |

OTHER PUBLICATIONS

Goldberg, "Extending PCM Video Response Above the Nyquist Limit", International Broadcasting Convention (Conference; London, England, Sep. 20-24, 1976), pp. 89-91.

*Primary Examiner*—Donald McElheny, Jr.
*Attorney, Agent, or Firm*—Andrus, Sceales, Starke & Sawall

[57] ABSTRACT

A video signal recording and reproducing apparatus comprises a circuit for generating a first signal having a sampling frequency $f_s$ which is approximately a natural number multiple of a horizontal scanning frequency $f_H$ of an input composite video signal and satisfies $f_s \approx f_L + f_U$ and having a phase which differs by 180° for every one field, where $f_L$ represents a constant frequency in the range of 0.5 to 1 MHz and $f_U$ represents an upper limit frequency of a band required for a reproduced composite video signal, a circuit for sampling a signal part of the input composite video signal at least excluding synchronizing signal intervals thereof by the first signal, a circuit for recording and reproducing the sampled signal on and from a recording medium, a circuit for obtaining from the reproduced signal first and second reproduced sampled signals having a mutual time difference of one field, a circuit for generating from the reproduced signal a second signal having the frequency $f_s$ and having a phase which differs by 180° for every one field, and a circuit supplied with the second signal for alternately and selectively passing the first and second reproduced sampled signals for every ½ period of the second signal so as to obtain a reproduced composite video signal which has been re-sampled.

7 Claims, 7 Drawing Figures

VIDEO SIGNAL RECORDING AND REPRODUCING APPARATUS

BACKGROUND OF THE INVENTION

The present invention generally relates to video signal recording and reproducing apparatuses, and more particularly to a video signal recording and reproducing apparatus which records at the time of a recording a sampled signal which is obtained by sampling an input composite video signal at a frequency slightly higher than an upper limit frequency of a frequency band required by the input composite video signal, and obtains a reproduced video signal at the time of a reproduction by alternately and time-sequentially multiplexing for every one sampling point two kinds of reproduced sampled signals having a mutual time difference of one field.

Generally, a helical scan type video tape recorder (hereinafter simply referred to as a VTR) records at the time of a recording a video signal on a traveling magnetic tape by use of one or a plurality of rotary heads, and reproduces at the time of a reproduction the recorded video signal from the magnetic tape by use of the one or plurality of rotary heads. The above video signal has a wide frequency band having an upper limit frequency of 4.2 MHz, for example. For example, in order to frequency-modulate the video signal having the wide frequency band and record and reproduce the frequency modulated video signal on and from the magnetic tape, it is necessary to set a relative speed between the head and the magnetic tape to a high speed over a predetermined value and use a high-performance head which is highly sensitive in the high-frequency range, as is well known.

However, in the case of a VTR for home use, the relative speed between the head and the mangetic tape is inevitably set to a speed which is considerably smaller than the predetermined value due to the necessity to reduce the size and weight and manufacture the VTR for home use at a low cost. For this reason, the recording and reproducing frquency band of the VTR for home use became narrower than the original frequency band of the video signal, and this interfered with the reproduction of a picture having a high picture quality.

Accordingly, one of the inventors of the present application has previously proposed a video signal recording and reproducing apparatus in a U.S. patent application Ser. No. 620,016 entitled "VIDEO SIGNAL RECORDING AND REPRODUCING APPARATUS" filed June 13, 1984. According to this previously proposed video signal recording and reproducing apparatus, a recording video signal is sampled at a frequency $f_s$ which is slightly higher than the frequency band of the recording video signal, and the sampled signal is recorded on a recording medium. The signal which is reproduced from the recording medium is delayed by one horizontal scanning period, and the delayed signal and an undelayed signal are alternately sampled at the frequency $f_s$ and mixed so as to obtain a reproduced video signal which has essentially been sampled at a frequency $2f_s$ which is twice the frequency $f_s$. According to this previously proposed apparatus, it is possible to reproduce signal components in a relatively high frequency range, with a relatively narrow frequency band, and thus, it is possible to obtain a reproduced video signal having a wide frequency band.

However, according to the previously proposed apparatus, the sampling frequency $f_s$ is selected to an odd number multiple of the horizontal scanning frequency $f_H$ of the video signal, that is, $f_s=(2n+1)f_H/2$, where n is an integer. On the other hand, since the video signal can be divided roughly into the system employing 525 scanning lines and the system employing 625 scanning lines, the sampling point within the picture varies for every one frame (two fields). For this reason, when the video signal has no vertical correlation, such as the case where the video signal is related to an oblique line in the picture, a phenomenon which is sometimes referred to as a crawling phenomenon occurs. When this crawling phenomenon occurs, there is a problem in that the oblique line which should actually be stationary in the picture, drifts upwardly or downwardly in the picture. Moreover, because the previously proposed apparatus employs a 1H delay circuit for producing a time delay of one horizontal scanning period, there is also a problem in that the resolution in the vertical direction of the picture becomes deteriorated. In the present specification, the resolution in the vertical direction of the picture will simply be referred to as the vertical resolution.

Further, at the time of the recording, the previously proposed apparatus also performs the sampling with respect to the synchronizing signals of the input composite video signal. Hence, when a jitter is introduced between timing of the edge of the synchronizing signals and the timing of the sampling pulse having the sampling frequency $f_s$, there is a problem in that the sampled composite video signal which is recorded will include the jitter. In addition, at the time of the reproduction, the re-sampling is performed at all signal intervals, that is, even in the intervals other than the video interval of the video signal. As a result, there are problems in that the circuit construction cannot be simplified and the circuit cannot be manufactured at a low cost.

SUMMARY OF THE INVENTION

Accordingly, it is a general object of the present invention to provide a novel and useful video signal recording and reproducing apparatus in which the problems described heretofore are eliminated.

Another object of the present invention is to provide a video signal recording and reproducing apparatus in which a sampling frequency $f_s$ of a sampling pulse is selected to a predetermined frequency and the phase of the sampling pulse is made to differ for every one field. The sampling is performed by use of this sampling pulse with respect to a signal part of an input composite video signal at least excluding synchronizing signal intervals thereof.

A more specific object of the present invention is to provide a video signal recording and reproducing apparatus for recording the input composite video signal such as the luminance signal on a recording medium and for reproducing the recorded signal from the recording medium. The video signal recording and reproducing apparatus comprises first signal generating means for generating a signal having a sampling frequency $f_s$ which is approximately a natural number multiple of a horizontal scanning frequency $f_H$ of the input composite video signal and satisfies an equation $f_s \approx f_L + f_U$ and having a phase which differs by 180° for every one field of the input composite video signal, where $f_L$ represents a constant frequency in the range of 0.5 MHz to 1 MHz and $f_U$ represents an upper limit frequency of a frequency band required for a reproduced composite video signal, sampling means for sampling a signal part of the input composite video signal at least excluding synchronizing signal intervals thereof by an output signal of the first signal generating means, recording means for recording a sampled signal obtained from the sampling means on a recording medium, reproducing means for reproducing the recorded signal from the recording medium, reproduced sampled signal generating means for obtaining from an output reproduced signal of the reproducing means first and second reproduced sampled signals having a mutual time difference of one field, second signal generating means for generating from the reproduced signal a signal having the sampling frequency $f_s$ and having a phase which differs by 180° for every one field, and re-sampling means supplied with an output signal of the second signal generating means as a switching signal therefor for alternately and selectively passing the first and second reproduced sampled signals for every one-half period of the switching signal so as to obtain a reproduced composite video signal which has been essentially re-sampled with a frequency $2f_s$.

According to the apparatus of the present invention, it is possible to improve the horizontal resolution to approximately 300 lines or more by use of a recording and reproducing apparatus having a narrow frequency band (for example, a horizontal resolution of 240 lines). In addition, it is possible to prevent the sampled signal which is to be recorded from having jitter due to the jitter in the relative phase between the sampling pulse and the synchronizing signals, because the sampling and re-sampling are not performed with respect to a signal interval at least including the synchronizing signal intervals. Moreover, since the re-sampling process is performed only with respect to the signal interval excluding at least the synchronizing signal intervals, it is possible to reduce the memory capacity required in a memory which is used for the re-sampling. On the other hand, because the re-sampling process is performed with respect to the high-frequency component over the frequency $f_L$, an analog-to-digital converter, a field memory, a digital-to-analog converter and the like which are used at the time of the reproduction to obtain the first and second reproduced sampled signals having the mutual time difference of one field and to alternately and selectively pass the first and second reproduced sampled signals, do not require a large number of bits and the circuit can accordingly be manufactured at a low cost. Further, since the aliasing frequency spectrum caused by the sampling does not exist with respect to the low-frequency component under the frequency $f_L$ and the recording and reproduction can be performed as is, it is possible to maintain a satisfactory vertical resolution. It is also possible to make the after image virtually inconspicuous because the sampling and re-sampling are performed only with respect to the high-frequency component over the frequency $f_L$. It is unnecessary to independently generate a field discrimination signal, and a head switching pulse which is originally generated in the recording and reproducing apparatus can be used to discriminate the field. According to the apparatus of the present invention, it is possible to prevent the occurrence of the crawling phenomenon and improve the vertical resolution.

Other objects and further features of the present invention will be apparent from the following detailed description when read in conjunction with the accompanying drawings.

DETAILED DESCRIPTION

Figure 1:
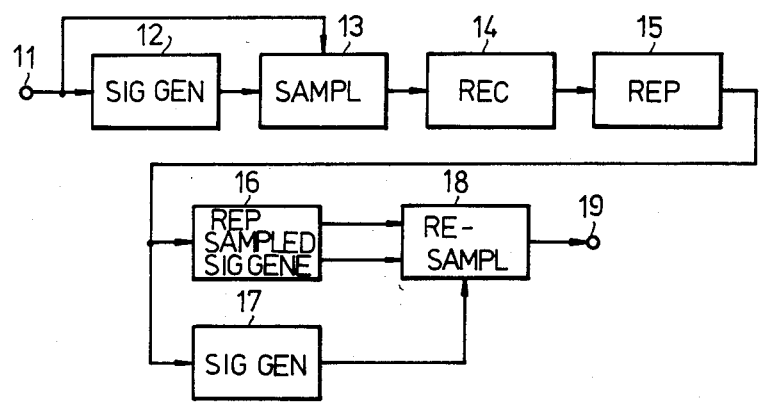
FIG. 1 is a system block diagram showing an embodiment of a video signal recording and reproducing apparatus according to the present invention.

In the embodiment shown in FIG. 1, an input composite video signal such as the luminance signal is applied to an input terminal 11 and is supplied to a first signal generating circuit 12 and a sampling circuit 13. The first signal generating circuit 12 generates a signal having a sampling frequency $f_s$ which is approximately a natural number multiple of a horizontal scanning frequency $f_H$ of the input composite video signal and satisfies the following equation (1) and having a phase which differs by 180° for every one field of the input composite video signal, where $f_L$ represents a constant frequency in the range of 0.5 MHz to 1 MHz and $f_U$ represents an upper limit frequency of a frequency band required for a reproduced composite video signal.

$$f_s \approx f_L + f_U \qquad (1)$$

The sampling circuit 13 samples the input composite video signal by the output signal of the first signal generating circuit 12, but does not perform the sampling with respect to the synchronizing signal intervals and passes the synchronizing signals as they are.

A sampled signal obtained from the sampling circuit 13 is recorded on a recording medium (not shown) by recording means 14. The recorded signal is reproduced from the recording medium by reproducing means 15. The recording means 14 and the reproducing means 15 have conventionally known constructions. The signal (reproduced signal) reproduced from the recording medium by the reproducing means 15 is supplied to a reproduced sampled signal generating circuit 16 and a second signal generating circuit 17. The reproduced sampled signal generating circuit 16 simultaneously generates from the reproduced signal first and second reproduced sampled signals having a relative time difference of one field. The second signal generating circuit 17 generates a signal having a frequency identical to the frequency $f_s$ of the output signal of the first signal generating circuit 12 and having a phase which differs by 180° for every one field of the reproduced signal. A re-sampling circuit 18 is supplied with the output signal of the second signal generating circuit 12 as a switching signal therefor, and alternately and selectively passes the first and second reproduced sampled signals from the reproduced sampled signal generating circuit 16 for every one-half period of the switching signal. Accordingly, a reproduced composite video signal which has been essentially sampled with a frequency $2f_s$ is obtained through an output terminal 19.

The sampling circuit 13 does not perform the sampling at least with respect to the synchronizing signals. For this reason, even when a jitter exists in the relative phase between the synchronizing signals and the output signal (sampling pulse) of the first signal generating circuit 12, it is possible to perform the recording so that the synchronizing signals do not include the jitter caused by the sampling. In addition, it is possible to improve the vertical resolution and prevent the occurrence of the crawling phenomenon.

In other words, in the case where the frequency $f_s$ of the sampling pulse is selected to a natural number multiple of the horizontal scanning frequency $f_H$ as described before, the information (picture element data) at each of the sampling points of the sampled signal generated from the sampling circuit 13 is arranged with a time interval of $1/f_s$ in the horizontal scanning direction for each of the scanning lines of the odd field indicated by solid lines and for each of the scanning lines of the even field indicated by phantom lines. Further, the sampling points in one field are arranged at the same positions in the horizontal scanning direction for each of the scanning lines of the one field and are formed in lines along the vertical direction of the picture, as indicated by white circular marks in FIG. 3A. However, according to the present invention, the input composite video signal is sampled by the sampling pulse having the phase which differs by 180° for every one field, and the reproduced sampled signal is re-sampled by the pulse having the phase which differs by 180° for every one field. As a result, the information at each of the sampling points of the sampled signal in the odd field and the information at each of the sampling points in the even field, are displayed with a relative time interval of $\frac{1}{2}f_s$ in the picture as indicated by the white circular marks in FIG. 3A. The crawling phenomenon described before will not occur because the positional relationship of the sampling points is constant for each frame.

In the previously proposed video signal recording and reproducing apparatus described before, the positions of the sampling points of the video signal which is obtained by performing the sampling and re-sampling with the sampling frequency $f_s$ selected to an odd number multiple of $\frac{1}{2}$ the horizontal scanning frequency $f_H$, are mutually deviated by a time interval of $\frac{1}{2}f_s$ between two mutually adjacent scanning lines of one field. On the other hand, according to the present invention, the positions of the sampling points of the video signal in the scanning lines of one field are in lines along the vertical scanning direction as shown in FIG. 3A, and the vertical resolution is doubled.

Figure 3:
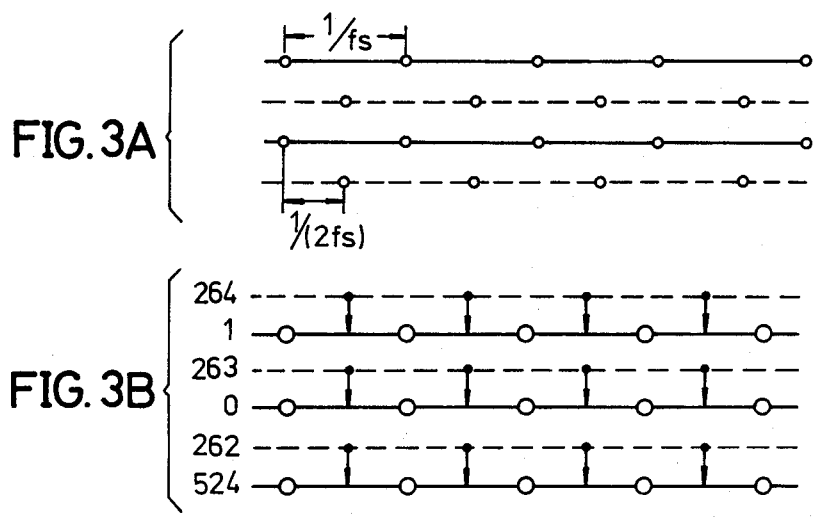
FIGS. 3A and 3B are diagrams for explaining the sampling and re-sampling performed in the video signal recording and reproducing apparatus according to the present invention.

In addition, when it is assumed that the sampling points of the first reproduced sampled signal supplied to the re-sampling circuit 18 in three adjacent scanning lines are located at positions indicated by white circular marks in FIG. 3B, for example, the sampling points of the second reproduced sampled signal which is delayed by one field with respect to the first reproduced sampled signal are located at positions indicated by black circular marks in FIG. 3B. However, because the re-sampling circuit 18 alternately and selectively generates the first and second reproduced sampled signals for every time period of $\frac{1}{2}f_s$, a reproduced composite video signal in which the sampling points of one field before indicated by the black circular marks in FIG. 3B are inserted between respective sampling points of the present field indicated by the white circular marks as indicated by arrows, is obtained through the output terminal 19. In other words, the reproduced composite video signal obtained through the output terminal 19 has essentially been sampled with a sampling frequency of $2f_s$, and it is possible to obtain a reproduced composite video signal having a wide frequency band compared to the conventional apparatus and it is possible to improve the horizontal resolution.

In FIG. 3B, numbers indicated in the left represent the delay in terms of horizontal scanning line numbers with reference to the scanning line represented by a number "0".

The video signal recording and reproducing apparatus shown in FIG. 1 uses the sampling points of one field before. For this reason, there is a problem in that an after image occurs when recording and reproducing a video signal having no field correlation such as a video signal related to a moving picture. Accordingly, another embodiment in which this problem is eliminated, is shown in FIG. 2.

Figure 2:
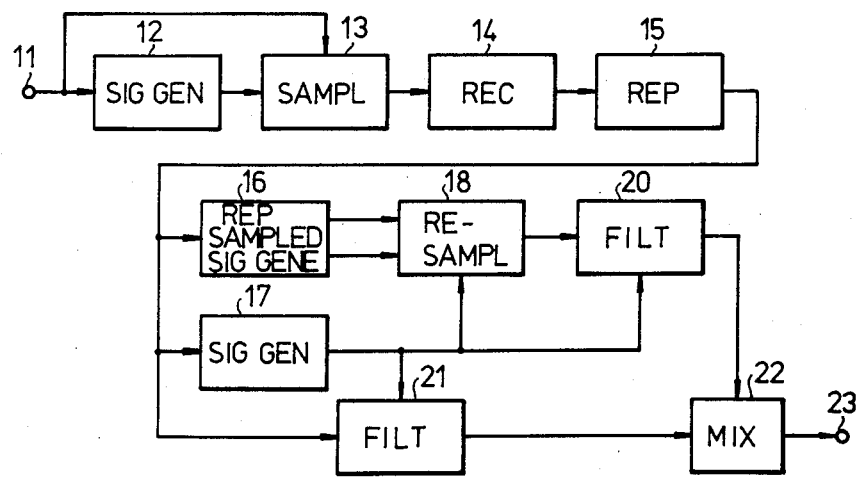
FIG. 2 is a system block diagram showing another embodiment of the video signal recording and reproducing apparatus according to the present invention.

FIG. 2 is a system block diagram showing the other embodiment of the video signal recording and reproducing apparatus according to the present invention. In FIG. 2, those parts which are the same as those corresponding parts in FIG. 1 are designated by the same reference numerals, and description thereof will be omitted. The signal obtained from the re-sampling circuit 18 is filtered of the high-frequency component thereof over the frequency $f_L$ in the equation (1) described before in a first filter circuit 20. The high-frequency component is obtained from the first filter circuit 20 only during a time interval excluding at least the synchronizing signal intervals, and is supplied to a mixing circuit 22. The reproduced signal from the reproducing means 15 is supplied to the reproduced sampled signal generating circuit 16, the second signal generating circuit 17, and a second filter circuit 21. The reproduced signal is filtered of the low-frequency component thereof under the frequency $f_L$ in the second filter circuit 21. The low-frequency component is obtained from the second filter circuit 21 only during a time interval excluding the synchronizing signal intervals, and is supplied to the mixing circuit 22. The mixing circuit 22 mixes the output signals of the first and second filter circuits 20 and 21, and supplies an output signal an output terminal 23 as the reproduced composite video signal. The reproduced composite video signal obtained through the output terminal 23 includes no aliasing frequency spectrum caused by the sampling with respect to the low-frequency component under the frequency $f_L$, and has been re-sampled only with respect to the high-frequency component over the frequency $f_L$.

According to the second embodiment of the video signal recording and reproducing apparatus shown in FIG. 2, the area over which the after image occurs is made extremely small by the provision of the first and second filter circuits 20 and 21 and the mixing circuit 22. As a result, the after image is virtually inconspicuous in the picture. In the low-frequency range of the video signal under the frequency $f_L$ where the human eye is sensitive, the sampling frequency $f_s$ is selected to the frequency satisfying the equation (1) described before. For this reason, the aliasing frequency component caused by the sampling does not exist at all, and it is possible to obtain a satisfactory vertical resolution.

Furthermore, since the re-sampling process at the time of the reproduction is only performed with respect to the high-frequency component over the frequency $f_L$, the circuit construction can be simplified compared to the case where the re-sampling process is performed with respect to the entire frequency band.

More detailed description will now be given with respect to concrete embodiments of the video signal recording and reproducing apparatus according to the present invention.

Figure 4:
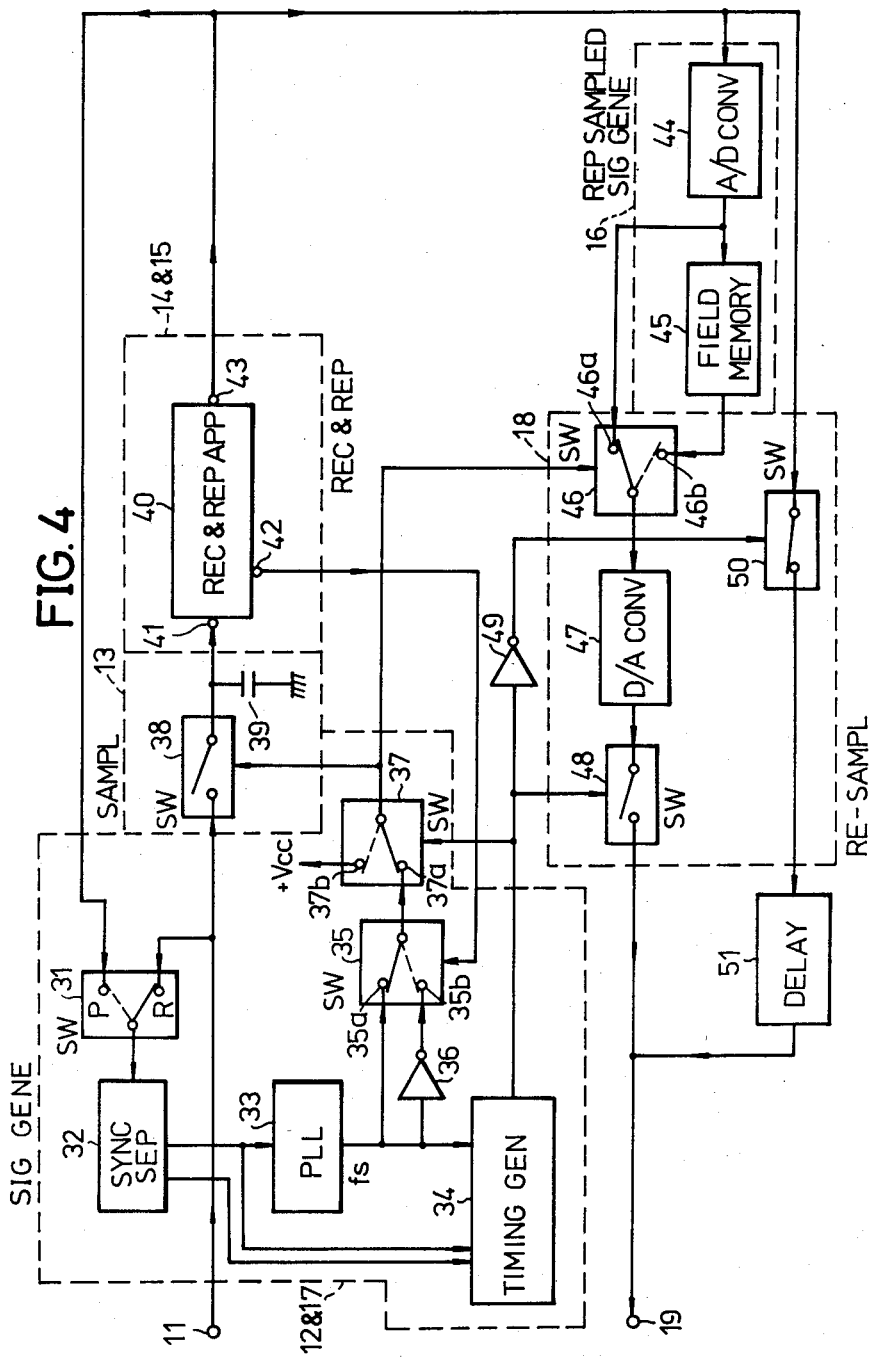
FIG. 4 is a system block diagram showing a concrete construction of the embodiment shown in FIG. 1.

FIG. 4 is a system block diagram showing a concrete construction of the embodiment shown in FIG. 1. In FIG. 4, those parts which are the same as those corresponding parts in FIG. 1 are designated by the same reference numerals. First, a description will be given with respect to the operation at the time of the recording. At the time of the recording, the input composite video signal (for example, a luminance signal) is applied to the input terminal 11 and is supplied to a synchronizing signal separating circuit 32 through a switching circuit 31 which is connected to a terminal R. The synchronizing signal separating circuit 32 separates horizontal and vertical synchronizing signals from the input composite video signal. The separated horizontal synchronizing signal is supplied to a phase locked loop (PLL) circuit 33 and a timing generator 34, and the separated vertical synchronizing signal is supplied to the timing generator 34. The PLL circuit 33 generates a sampling pulse which is in phase synchronism with the horizontal synchronizing signal and has the sampling frequency $f_s$ which is a natural number multiple of the horizontal scanning frequency $f_H$ and satisfies the equation (1) described before. The output sampling pulse of the PLL circuit 33 is supplied to the timing generator 34 and a terminal 35a of a switching circuit 35. The output sampling pulse of the PLL circuit 33 is also inverted (made to differ by 180° in phase) in an inverter 36, and the output signal of the inverter 36 is supplied to a terminal 35b of the switching circuit 35. A known head switching pulse which is a symmetrical square wave having a period of two fields is generated in a recording and reproducing apparatus 40 which will be described later on in the specification, and is applied to the switching circuit 35 as a switching pulse through an output terminal 42 so as to switch a moving contact of the switching circuit 35 between the terminals 35a and 35b for every one field.

Accordingly, the switching circuit 35 generates a sampling pulse which has the frequency $f_s$ and has a phase differing by 180° for every one field. The output sampling pulse of the switching circuit 35 is supplied to a terminal 37a of a switching circuit 37. A D.C. voltage +Vcc is applied to a terminal 37b of the switching circuit 37. On the other hand, at the time of the recording, the timing generator 34 generates a pulse having a first logic value in phase synchronism with horizontal and vertical blanking periods of the input composite video signal and has a second logic value during other time periods, and applies this pulse to the switching circuit 37 as a switching pulse. Hence, during the horizontal and vertical blanking periods, the switching circuit 37 selectively passes the D.C. voltage Vcc applied to the terminal 37b and accordingly turns ON a switching circuit 38 by the D.C. voltage Vcc. On the other hand, during time periods (video periods) other than the horizontal and vertical blanking periods, the switching circuit 37 selectively passes the switching pulse applied to the terminal 37a and supplies this switching pulse to the switching circuit 38.

Therefore, the switching circuit 38 is alternately turned ON and OFF for every video period of the input composite video signal and for every one-half period $\frac{1}{2}f_s$ of the sampling pulse, and the input composite video signal obtained during the time period in which the switching circuit 38 is turned ON is applied to a holding capacitor 39. A sampled signal which is obtained by sampling the input composite video signal during the video period thereof with the sampling frequency $f_s$, is obtained from the holding capacitor 39 and is supplied to a recording video signal input terminal 41 of the recording and reproducing apparatus 40. The recording video signal input terminal 41 is an input terminal of a luminance signal recording system of the existing VTR. Since the switching circuit 38 remains in the ON state during the blanking periods, at least the synchronizing signals of the input composite video signal are supplied to the recording video signal input terminal 41 without being sampled.

As may be understood from the equation (1), the sampling frequency $f_s$ is higher than the upper limit frequency $f_U$ of the frequency band required for the reproduced composite video signal by the frequency $f_L$, where the frequency $f_L$ is a frequency lower than the upper limit frequency $f_U$ and is in the range of 0.5 MHz to 1 MHz. Accordingly, the aliasing frequency spectrum caused by the sampling is introduced in the frequency range between the upper limit frequency $f_U$ and the frequency $f_L$, but the aliasing frequency spectrum does not exist at all in the frequency range between zero and the frequency $f_L$ and the signal can be transmitted as it is without being subjected to interference by other signals. The frequency $f_L$ is selected to the frequency in the range of 0.5 MHz to 1 MHz so that it is possible to maintain the required minimum vertical resolution.

The recording means 14 and the reproducing means 15 are constituted by the recording and reproducing apparatus 40. The recording and reproducing apparatus 40 is an existing VTR having a narrow frequency band and a horizontal resolution in the range of 240 lines, for example. The sampled signal is passed through a known recording system within the recording and reproducing apparatus 40 and is recorded on a magnetic tape (not shown) and is reproduced from the magnetic tape.

Next, a description will be given with respect to the operation at the time of the reproduction. At the time of the reproduction, the reproduced sampled signal is obtained through a reproduced video signal output terminal 43 and is supplied to the synchronizing signal separating circuit 32 through the switching circuit 31 which is connected to a terminal P. On the other hand, the reproduced sampled signal is supplied to a field memory 45 through an analog-to-digital (A/D) converter 44. The horizontal synchronizing signal within the reproduced sampled signal is supplied to the PLL circuit 33 and the timing generator 34, and the sampling pulse having the frequency $f_s$ which is a natural number multiple of the horizontal scanning frequency $f_H$ and satisfies the equation (1) is generated similarly as at the time of the recording. The timing generator 34 is supplied with the horizontal and vertical synchronizing signals and generates a pulse having different logic values in the blanking periods and the video periods of the reproduced sampled signal. That is, a circuit part from the switching circuit 31 to the switching circuit 37, is used in common as the first signal generating circuit 12 and the second signal generating circuit 17.

The field memory 45 comprises a random access memory (RAM) and reads out an input digital signal thereof (digital signal of the first reproduced sampled signal) after delaying the input digital signal by one field. An output digital signal (digital signal of the second reproduced sampled signal) of the field memory 45 is supplied to a terminal 46b of a switching circuit 46. As will be described later, the re-sampling is not performed during the blanking period, and the re-sampling is only performed during the video period. Hence, the field memory 45 only needs to write in and read out the digital data related to the video period. As a result, the memory capacity of the field memory 45 only needs to have a small memory capacity in the order of 80% the memory capacity which will be required when delaying the video signal by one field with respect to all intervals of the video signal including the video period and other periods, and an inexpensive RAM can be used for the field memory 45.

The switching circuit 46 is applied with the output sampling pulse of the switching circuit 37 having the sampling frequency $f_s$ as a switching pulse therefor. The switching circuit 46 alternately and selectively passes the output signal of the A/D converter 44 applied to a terminal 46a and the output delayed signal of the field memory 45 applied to the terminal 46b, for every one-half period of the switching pulse. Thus, as described before, a re-sampled signal which has been essentially sampled with the sampling frequency $2f_s$ is passed through a digital-to-analog (D/A) converter 47 and is supplied to a switching circuit 48.

On the other hand, the output pulse of the timing generator 34 is applied to the switching circuit 48, so as to turn the switching circuit 48 OFF during the blanking periods and turn the switching circuit 48 ON during the video periods. The output pulse of the timing generator 34 is also passed through an inverter 49 and is applied to a switching circuit 50, so as to turn ON the switching circuit 50 during the blanking periods and turn OFF the switching circuit 50 during the video periods. Accordingly, during the blanking period, the synchronizing signals and the like which are not re-sampled and obtained from the switching circuit 50 are passed through a delay circuit 51 which is provided to compensate for the time delay of the reproduced sampled signal in the field memory 45 and are supplied to the output terminal 19. During the video period, the re-sampled signal obtained from the switching circuit 48 is supplied to the output terminal 19.

Figure 5:
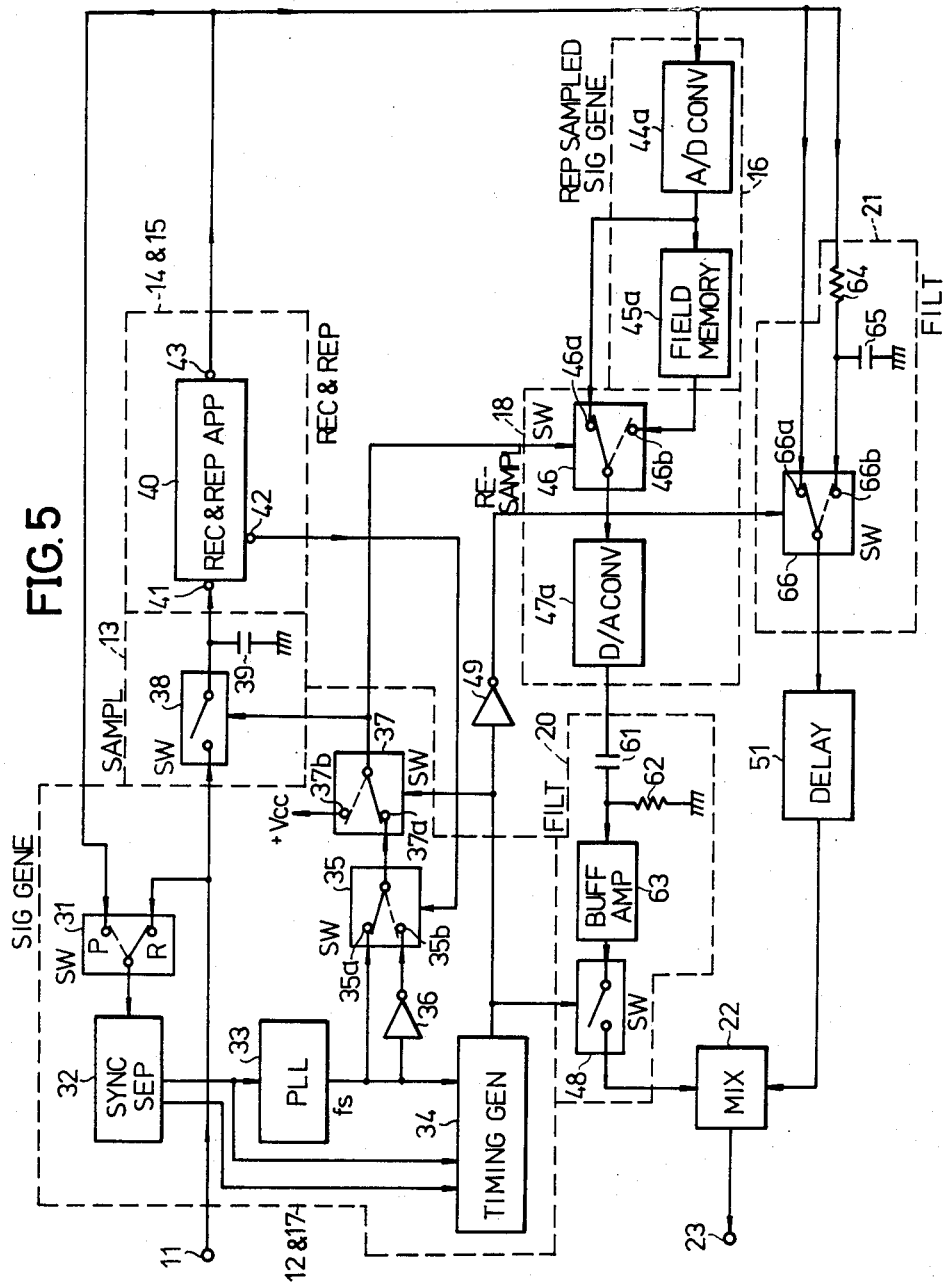
FIG. 5 is a system block diagram showing a concrete construction of the embodiment shown in FIG. 2.

Next, a description will be given with respect to the concrete construction of the embodiment shown in FIG. 2, by referring to FIG. 5. In FIG. 5, those parts which are the same as those corresponding parts in FIGS. 2 and 4 are designated by the same reference numerals, and description thereof will be omitted. The recording system of the embodiment shown in FIG. 5 is the same as the recording system of the embodiment shown in FIG. 4, however, the reproducing system shown in FIG. 5 is different from the reproducing system shown in FIG. 4. The re-sampled signal obtained from a D/A converter 47a is supplied to a highpass filter comprising a capacitor 61 and a resistor 62. The high-frequency component of the re-sampled signal over the frequency $f_L$ is separated in the highpass filter and is supplied to the mixing circuit 22 by way of a buffer amplifier 63 and the switching circuit 48.

On the other hand, the reproduced signal obtained through the reproduced video signal output terminal 43 of the recording and reproducing apparatus 40 is supplied to a terminal 66a of a switching circuit 66. The reproduced signal is also supplied to a lowpass filter comprising a resistor 64 and a capacitor 65. The low-frequency component of the reproduced signal under the frequency $f_L$ is separated in the lowpass filter and is supplied to a terminal 66b of the switching circuit 66. The switching of the switching circuit 66 is controlled by the output pulse of the inverter 49 so that a moving contact of the switching circuit 66 is connected to the terminal 66b during the video periods and is connected to the terminal 66a during the horizontal and vertical blanking periods. An output signal of the switching circuit 66 is supplied to the mixing circuit 22 through the delay circuit 51. Hence, during the video period, a mixed signal comprising the high-frequency component of the re-sampled signal over the frequency $f_L$ and the low-frequency component of the reproduced signal under the frequency $f_L$ and having no aliasing frequency spectrum caused by the sampling, is obtained from the mixing circuit 33 and is supplied to the output terminal 23. During the horizontal and vertical blanking periods, the synchronizing signals and the like which has not been sampled nor re-sampled, are obtained from the mixing circuit 22 and is supplied to the output terminal 23.

According to the present embodiment, the re-sampling is only performed with respect to the high-frequency component, and an A/D converter 44a and the D/A converter 47a does not require a large number of bits. It has been confirmed that the number of bits required in the present embodiment can be reduced by approximately one-half to five bits, for example, compared to the number of bits (eight bits) required in the A/D converter 44 and the D/A converter 47 of the first embodiment wherein the re-sampling is performed with respect to the entire frequency band. In addition, the memory capacity of a field memory 45a of the present embodiment can be approximately $\frac{5}{8}$ the memory capacity required in the field memory 45 of the first embodiment wherein the re-sampling is performed with respect to the entire frequency band.

Figure 6:
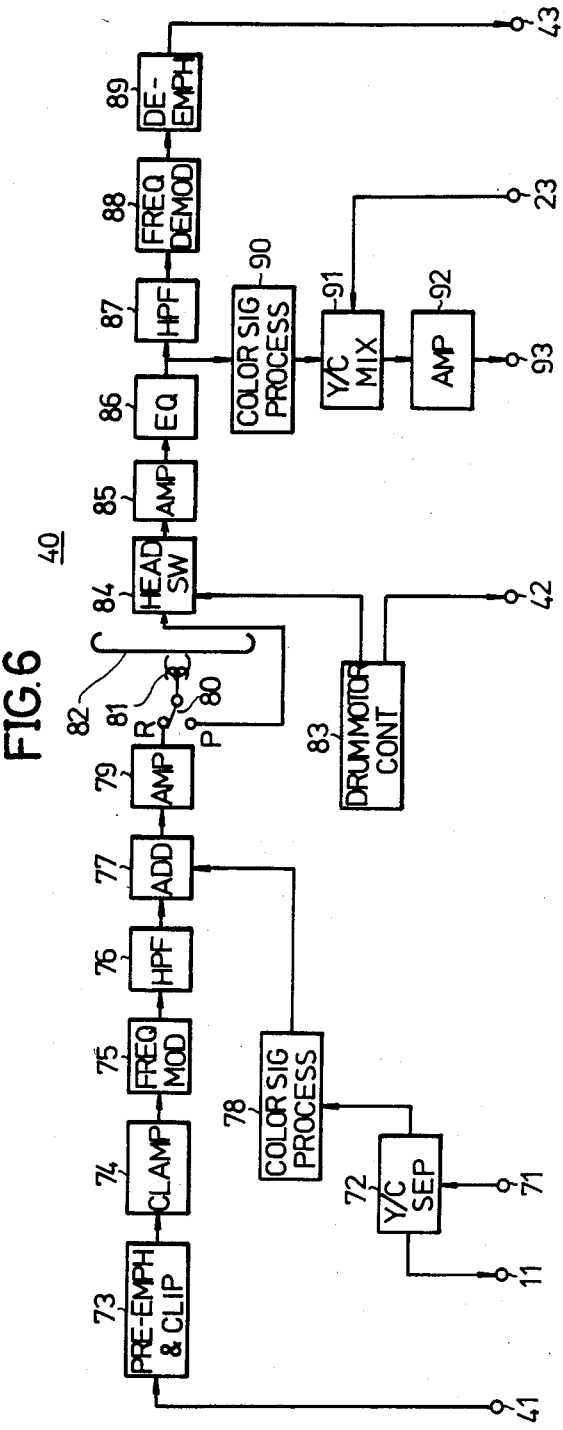
FIG. 6 is a general system block diagram showing a VTR and the relationships thereof with respect to signal terminals in FIG. 5 which are connected to the VTR when the VTR is used as the video signal recording and reproducing apparatus.

In the case where an existing helical scan type VTR is used for the recording and reproducing apparatus 40, signal terminals are provided as shown in FIG. 6. In FIG. 6, those parts which are the same as those corresponding parts in FIG. 5 are designated by the same reference numerals. In the existing VTR shown in FIG. 6, the input composite video signal applied to a recording video signal input terminal 71 is supplied to a luminance signal and carrier chrominance signal separating circuit (hereinafter simply referred to as a Y/C separating circuit) 72 wherein the luminance signal and the carrier chrominance signal are separated from the input composite video signal. The separated luminance signal is supplied to the circuit shown in FIG. 5 through the input terminal 11. On the other hand, the luminance signal which is applied to the input terminal 41 is passed through a pre-emphasis and clipping circuit 73, a clamping circuit 74, a frequency modulator 75, and a highpass filter 76. An output signal of the highpass filter 76 is supplied to an adding circuit 77. The separated carrier chrominance signal from the Y/C separating circuit 72 is converted into a signal format suited for magnetic recording and reproduction, in a color signal processing circuit 78. The adding circuit 77 adds the output signal of the highpass filter 76 and the output signal of the color signal processing circuit 78. For example, the output signal of the color signal processing circuit 78 is a carrier chrominance signal which is frequency-converted into a low-frequency band, and the adding circuit 77 frequency-division-multiplexes the output signal of the highpass filter 76 with the output frequency converted carrier chrominance signal of the color signal processing circuit 78.

An output multiplexed signal of the adding circuit 77 is passed through a recording amplifier 79 and is supplied to rotary heads 81 through a switch 80 which is connected to a terminal R at the time of the recording. The multiplexed signal supplied to the rotary heads 81 is recorded on a magnetic tape 82. At the time of the recording, a drum motor control circuit 83 for controlling the rotation of a rotary drum (not shown) on which the rotary heads 81 are mounted, generates a head switching pulse which is in phase synchronism with the rotation of the rotary heads 81. This head switching pulse is obtained through the output terminal 42.

The recorded multiplexed signal is reproduced from the magnetic tape 82 by the rotary heads 81 which are rotated under control based on the output signal of the drum motor control circuit 83. The reproduced signal is passes through the switch 80 which is connected to the terminal P at the time of the reproduction, and is supplied to a head switching circuit 84. As is well known, there are two rotary heads 81 provided diametrically on the rotary drum, and the magnetic tape 82 travels in a state where the magnetic tape 82 is in contact with the rotary drum over an angular range slightly larger than 180°. The reproduced signals alternately obtained from the two rotary heads 81 are hence supplied to the head switching circuit 84 and is formed into a continuous reproduced signal responsive to the head switching pulse from the drum motor control circuit 83. The reproduced multiplexed signal from the head switching circuit 84 is passed through a preamplifier 85 and an equalizer 86, and is supplied to a highpass filter 87 wherein a frequency modulated luminance signal is separated. The separated frequency modulated luminance signal is supplied to a frequency demodulator 88 and is frequency-demodulated into a reproduced luminance signal. The reproduced luminance signal is passed through a de-emphasis circuit 89 and is supplied to the output terminal 43. On the other hand, the output reproduced multiplexed signal of the equalizer 86 is also supplied to a color signal processing circuit 90 wherein the frequency converted carrier chrominance signal is separated and is subjected to a known signal processing so as to obtain a reproduced carrier chrominance signal which is returned to the original frequency band and the original phase. The reproduced carrier chrominance signal is supplied to a Y/C mixer 91.

The Y/C mixer 91 mixes the reproduced carrier chrominance signal and the reproduced luminance signal which is obtained through the output terminal shown in FIG. 5, and generates a reproduced composite color video signal. The reproduced composite color video signal is passed through an amplifier 92 and is supplied to an output terminal 93.

The present invention is not limited to the embodiments described heretofore, and as a modification, the circuit part provided externally with respect to the recording and reproducing apparatus 40 can be unitarily assembled within the VTR, for example.

Further, the present invention is not limited to these embodiments, but various variations and modifications may be made without departing from the scope of the present invention.

What is claimed is:

1. A video signal recording and reproducing apparatus comprising:

first signal generating means for generating a signal having a sampling frequency $f_s$ which is approximately a natural number multiple of a horizontal scanning frequency $f_H$ of an input composite video signal and satisfies an equation $f_s \approx f_L + f_U$ and having a phase which differs by 180° for every one field of the input composite video signal, where $f_L$ represents a constant frequency in the range of 0.5 MHz to 1 MHz and $f_U$ represents an upper limit frequency of a frequency band required for a reproduced composite video signal;

sampling means for sampling a signal part of the input composite video signal by an output signal of said first signal generating means, said signal part at least excluding synchronizing signal intervals of the input composite video signal;

recording means for recording a sampled signal obtained from said sampling means on a recording medium;

reproducing means for reproducing the recorded signal from the recording medium;

reproduced sampled signal generating means for obtaining from an output reproduced signal of said reproducing means first and second reproduced sampled signals having a mutual time difference of one field;

second signal generating means for generating from the reproduced signal a signal having the sampling frequency $f_s$ and having a phase which differs by 180° for every one field; and re-sampling means supplied with an output signal of said second signal generating means as a switching signal therefor for alternately and selectively passing the first and second reproduced sampled signals for every one-half period of the switching signal so as to obtain a reproduced composite video signal which has been essentially re-sampled with a frequency $2f_s$.

2. A video signal recording and reproducing apparatus as claimed in claim 1 in which said second signal generating means generates a signal indicative of blanking periods of the reproduced signal, said re-sampling means selectively passing one of said first and second reproduced sampled signals during the blanking period and alternately passing said first and second reprduced sampled signals during time periods other than the blanking period.

3. A video signal recording and reproducing apparatus as claimed in claim 1 which further comprises first filter circuit means for filtering a high-frequency component over the frequency $f_L$ of the output reproduced composite video signal of said re-sampling means and for passing the high-frequency component during signal intervals at least excluding the synchronizing signal intervals, second filter circuit means for filtering a low-frequency component under the frequency $f_L$ of the output reproduced signal of said reproducing means and for passing the low-frequency component during predetermined signal intervals at least excluding the synchronizing signal intervals, said second filter circuit means passing the output reproduced signal of said reproducing means during signal intervals other than said predetermined signal interval, and mixing circuit means for mixing output signals of said first and second filter circuit means so as to generate a reproduced composite video signal.

4. A video signal recording and reproducing apparatus as claimed in claim 3 in which said first filter circuit means comprises a highpass filter for filtering the high-frequency component over the frequency $f_L$ of the output reproduced composite video signal of said re-sampling means, and a switching circuit responsive to a switching pulse generated in said second signal generating means for selectively passing an output signal of said highpass filter only during the video period, said switching pulse having different logic values during the video period and horizontal and vertical blanking periods.

5. A video signal recording and reproducing apparatus as claimed in claim 3 in which said second filter circuit means comprises a lowpass filter for filtering the low-frequency component over the frequency $f_L$ of said reproduced signal, and a switching circuit responsive to a switching pulse generated in said second signal generating means for selectively passing said reproduced signal during the blanking period and passing an output signal of said lowpass filter during the video period, said switching pulse having different logic values during the video period and horizontal and vertical blanking periods.

6. A video signal recording and reproducing apparatus as claimed in claim 1 in which said first and second signal generating means comprise a first switching circuit for selectively passing the input composite video signal at the time of a recording and for selectively passing said reproduced signal at the time of a reproduction, a synchronizing signal separating circuit for separating horizontal and vertical synchronizing signals from an output signal of said first switching circuit, a pulse generating circuit for generating two kinds of pulses based on the horizontal synchronizing signal from said synchronizing signal separating circuit, said two kinds of pulses having a repetition frequency equal to said sampling frequency $f_s$ and having phases mutually differing by 180°, a second switching circuit for alternately and selectively passing said two kinds of pulses for every one field, a timing generator supplied with the horizontal and vertical synchronizing signals from said synchronizing signal separating circuit and an output pulse of said pulse generating circuit for generating a switching pulse having different logic values during the blanking period and the video period, and a third switching circuit responsive to said switching pulse for selectively passing an output pulse of said second switching circuit during the video period and for selectively passing a constant voltage during the blanking period, said third switching circuit supplying an output signal thereof to said sampling means and said re-sampling means.

7. A video signal recording and reproducing apparatus as claimed in claim 1 in which said reproduced sampled signal generating means comprises an analog-to-digital converter for generating said first reproduced sampled signal by converting said reproduced signal into a digital signal, and a field memory for delaying an output signal of said analog-to-digital converter by one field, said field memory having a memory capacity for storing only data in the video period of said first reproduced sampled signal.

* * * * *